(12) United States Patent
Rittershofer et al.

(10) Patent No.: US 9,192,099 B2
(45) Date of Patent: Nov. 24, 2015

(54) INCLINED CONVEYOR ASSEMBLY WITH FLEXIBLE BOTTOM

(71) Applicant: Deere & Company, Moline, IL (US)

(72) Inventors: Martin Rittershofer, Kaiserslautern (DE); Volker Fuchs, Saarburg (DE); Johannes Juelke, Sonnewalde (DE)

(73) Assignee: DEERE & COMPANY, Moline, IL (US)

( * ) Notice: Subject to any disclaimer, the term of this patent is extended or adjusted under 35 U.S.C. 154(b) by 93 days.

(21) Appl. No.: 14/037,424

(22) Filed: Sep. 26, 2013

(65) Prior Publication Data

US 2014/0171165 A1   Jun. 19, 2014

(30) Foreign Application Priority Data

Dec. 19, 2012 (DE) .......................... 10 2012 223 770

(51) Int. Cl.
| | | |
|---|---|---|
| *A01D 67/00* | (2006.01) | |
| *A01D 75/28* | (2006.01) | |
| *A01D 41/12* | (2006.01) | |
| *A01F 12/10* | (2006.01) | |

(52) U.S. Cl.
CPC ................ *A01D 41/12* (2013.01); *A01F 12/10* (2013.01)

(58) Field of Classification Search
CPC ..... A01D 41/16; A01D 41/141; A01D 41/12; A01D 45/023; A01D 45/021; A01D 41/14; A01D 43/082; A01D 57/16; A01F 12/10
USPC ........ 460/114; 56/209, 208, DIG. 9, DIG. 10, 56/15.8
See application file for complete search history.

(56) References Cited

U.S. PATENT DOCUMENTS

| | | | | | |
|---|---|---|---|---|---|
| 2,753,675 | A | * | 7/1956 | Harp ............................... | 56/209 |
| 2,780,903 | A | * | 2/1957 | Kroll et al. ..................... | 56/209 |
| 2,871,646 | A | * | 2/1959 | Heitshu et al. .................. | 56/209 |
| 3,324,637 | A | * | 6/1967 | Windsor et al. ................ | 56/15.6 |
| 3,431,711 | A | * | 3/1969 | Claas .............................. | 56/15.6 |
| 3,731,470 | A | * | 5/1973 | Cornish et al. ................. | 56/10.4 |
| 4,253,295 | A | * | 3/1981 | Knepper ......................... | 56/15.6 |
| 4,266,391 | A | * | 5/1981 | McDuffie et al. .............. | 56/14.5 |

(Continued)

FOREIGN PATENT DOCUMENTS

| | | |
|---|---|---|
| DE | 1016975 B | 10/1957 |
| DE | 29519842 U1 | 2/1996 |

(Continued)

OTHER PUBLICATIONS

European Search Report in counterpart application No. 13192620.6, dated Mar. 27, 2014 (4 pages).

*Primary Examiner* — Árpád Fábián-Kovács

(57) ABSTRACT

An inclined conveyor assembly (20) for a combine harvester (10) comprises a housing (62) on whose rear end an upper conveyor roller (64) is supported such that it can rotate, a lower conveyor roller (90) positioned on the front end of the housing (62); an extendible, endless conveyor element (82) circulating around the lower conveyor roller (90) and around the upper conveyor roller (64), with carriers (84) and a pendulum plate (78), which is hinged on the front end of the housing (62) and which can swivel around a pendulum axle (76), on which a harvesting attachment (18) can be affixed. Below the endless conveyor element (82), there is a flexible bottom element (100), which is coupled with the pendulum plate (78) on its front end, and with the housing (62) of the inclined conveyor assembly (20) on its rear end.

9 Claims, 3 Drawing Sheets

(56) References Cited

U.S. PATENT DOCUMENTS

| | | | |
|---|---|---|---|
| 4,266,392 A * | 5/1981 | Knepper et al. | 56/14.5 |
| 4,282,703 A * | 8/1981 | Wilson et al. | 56/14.6 |
| 4,527,381 A * | 7/1985 | Mann | 56/209 |
| 4,612,757 A * | 9/1986 | Halls et al. | 56/10.2 E |
| 4,640,085 A * | 2/1987 | Rupprecht | 56/14.6 |
| 4,733,523 A * | 3/1988 | Dedeyne et al. | 56/209 |
| 4,776,153 A * | 10/1988 | DePauw et al. | 56/10.2 E |
| 5,341,628 A * | 8/1994 | Schumacher et al. | 56/10.2 E |
| 5,359,836 A * | 11/1994 | Zeuner et al. | 56/10.2 E |
| 5,415,586 A * | 5/1995 | Hanson et al. | 460/8 |
| 5,464,371 A * | 11/1995 | Honey | 460/20 |
| 5,799,483 A * | 9/1998 | Voss et al. | 56/14.9 |
| 5,918,448 A * | 7/1999 | Wheeler | 56/10.4 |
| 6,318,057 B1 * | 11/2001 | Burmann | 56/10.2 R |
| 6,510,680 B2 * | 1/2003 | Uhlending et al. | 56/208 |
| 6,519,923 B1 * | 2/2003 | Cooksey et al. | 56/14.9 |
| 6,735,929 B2 * | 5/2004 | Watts et al. | 56/14.9 |
| 6,826,894 B2 * | 12/2004 | Thiemann et al. | 56/10.2 E |
| 7,191,582 B2 * | 3/2007 | Bomleny | 56/10.2 E |
| 7,207,164 B2 * | 4/2007 | Bomleny | 56/10.2 E |
| 7,222,475 B2 * | 5/2007 | Bomleny et al. | 56/10.2 E |
| 7,430,846 B2 * | 10/2008 | Bomleny et al. | 56/10.2 E |
| 7,870,709 B2 * | 1/2011 | Digman | 56/10.2 E |
| 8,322,122 B2 * | 12/2012 | Dold et al. | 56/15.6 |
| 8,631,634 B2 * | 1/2014 | Vereecke et al. | 56/14.9 |

FOREIGN PATENT DOCUMENTS

| | | |
|---|---|---|
| DE | 10018211 A1 | 11/2001 |
| DE | 102004058116 A1 | 6/2006 |
| DE | 102007049839 B3 | 6/2009 |
| DE | 102009036104 A1 | 2/2011 |
| DE | 102012200843 | 1/2012 |
| EP | 1145619 A1 | 10/2001 |

* cited by examiner

INCLINED CONVEYOR ASSEMBLY WITH FLEXIBLE BOTTOM

FIELD

The invention under consideration refers to an inclined conveyor assembly for a combine harvester, with a housing, on whose rear end an upper conveyor roller is supported so it can rotate, a lower conveyor roller positioned on the front end of the housing, an endless conveyor element circulating around the lower conveyor roller and around the upper conveyor roller, with carriers, and a pendulum plate hinged on the front end of the housing so it can circulate around a pendulum axle, on which a harvesting attachment can be affixed.

BACKGROUND

Self-propelled combine harvesters comprise a chassis, which is supported by front, driven wheels (or caterpillar driving mechanisms) and rear, steerable wheels on the ground. On the front side of the combine harvester, there is an inclined conveyor assembly, on whose front end, in turn, a harvesting attachment is affixed in a detachable manner.

The harvesting attachment can, for example, be designed as a cutting mechanism with a mower bar and a reel located above the mower bar, and a rear cross conveyor auger or a cross conveyor belt, or can be constructed as a corn picker with picking units and a cross conveyor auger. During the harvesting operation, the harvesting attachment releases the out or gathered crop through a backward discharge opening to the inclined conveyer assembly, which it, in turn, conveys into the interior of the combine harvester, where it is threshed, separated, and cleaned.

The inclined conveyor assembly comprises a housing in which, typically, a chain conveyor, working from below circulates around a lower conveyor roller and an upper, conveyor roller, both of which conveyor rollers are supported so that they can rotate on the housing. The lower conveyor roller is situated in the rear of the discharge opening of the harvesting attachment and the upper conveyor roller delivers the crop to an (axial or tangential) threshing drum or to an accelerator roller in the combine harvester.

Inclined conveyor assemblies with conveyor belts, working from above, have also been proposed (DE 1 016 975 A), and an inclined conveyor assembly, working from below, with a rubber-fabric belt, which comprises transverse steel strips, meshing from above into the crop (DE 10 2007 049 839 B3, DE 10 2009 036 104 A1).

In many cases, a so-called pendulum plate is placed on the front end of the inclined conveyor assembly. This is a frame-shaped element, which is hinged, on the one hand, so it can swivel around a (real or virtual) pendulum axle, extending horizontally and in a forward direction, on the housing of the actual inclined conveyor assembly and on which, on the other hand, the harvesting attachment can be placed, for example, by means of upper hooks, which lie on the pendulum plate, from above. The pendulum plate makes possible a swiveling movement of the harvesting attachment, relative to the inclined conveyor assembly, around the horizontal pendulum axle, for example, when driving on a slope. In particular, the swiveling area must be relatively large if the combine harvester is equipped with height-adjustable front wheels, which keep the actual combine harvester and the inclined conveyor assembly horizontal when traveling on a slope. In this regard, reference is made to the state of the art according to DE 100 18 211 A1 and DE 295 19 842 U1.

What is found to be disadvantageous in the known inclined conveyors with a front pendulum plate is that the transfer of the crop from the harvesting attachment to the inclined conveyor assembly with large swivel angles of the harvesting attachment around the pendulum axle has proved to be problematic because an angle forms between the discharge opening of the harvesting attachment and the lower conveyor roller, which is rigidly affixed on the housing of the inclined conveyor, and the pendulum movement of the harvesting attachment does not cooperate. As a result of this angle, the crop must be conveyed on the downward-swiveled side of the harvesting attachment, via a stage upward, which can lead to a jamming of the crop. Moreover, the conveyor of the inclined conveyor does not optimally grab the crop on the downward-swiveled side. Finally, the upward-swiveled side of the harvesting attachment covers the feed roller, which also has a negative effect on the transfer of the crop from the harvesting attachment to the inclined conveyor. As a result, the combine harvester is also affected by the resulting variable thickness of the crop mat, which is not homogeneous over the width, and this can lead to unsatisfactory work results in the threshing and cleaning process.

DE 10 2004 058 116 A1 describes a combine harvester in which a partially flexible adapting device is located between the harvesting attachment and the housing of the inclined conveyor. The adapting device comprises two rectangular frames, coupled with one another by a horizontal pendulum axle, extending in the forward direction, of which one is rigidly coupled with the housing of the inclined conveyor and is affixed on the other frame of the harvesting attachment. Between the two frames, at least on the bottom, two flat spring steel elements are located, which are affixed on one of the frames and are coupled with connecting elements that extend through longitudinal holes into the spring steel elements. In this way, the transfer of the crop from the harvesting attachment into the housing of the inclined conveyor is to be facilitated. This adapting device is a separate element, which is inserted between the usual inclined conveyor and the harvesting attachment, and is constructed relatively short. Therefore, the angle via which the crop on the upward-swiveled side must be lifted upward from the harvesting attachment into the housing of the inclined conveyor, is rather steep, which can lead to conveyance problems on the other side.

The subsequently published DE 10 2012 200 843 A1 shows an inclined conveyor of a combine harvester with a front pendulum plate on which a harvesting attachment is affixed in a detachable manner. The pendulum plate is supported such that it can rotate around a horizontal pendulum axle, extending in the forward direction, relative to the housing of the inclined conveyor, and carries a front inclined conveyor roller, around which an endless, flexible conveyor element circulates, which also circulates around a rear inclined conveyor roller. The bottom of the inclined conveyor is inherently rigid.

The problem to be solved by the present invention is to avoid the aforementioned disadvantages.

SUMMARY

In accordance with a first aspect of the invention, an inclined conveyor assembly for a combine harvester comprises a housing, on whose rear end an upper conveyor roller is supported in such a way that it can rotate. On the front end of the housing, a lower conveyor roller is located.

On the front end of the housing, there is also a pendulum plate, on which a harvesting attachment can be placed in a detachable manner, hinged so it can swivel around a pendulum axle. An endless conveyor element with carriers circulates around the lower conveyor roller and around the upper conveyor roller. Below the endless conveyor element, there is a flexible bottom element, which is connected with the bottom of the pendulum plate on its front end and with the housing of the inclined conveyor on its rear end.

The flexible bottom element thus extends between the pendulum plate and the housing of the inclined conveyor. Since the front end of the flexible bottom element moves with the pendulum plate, and the rear end of the flexible bottom element is coupled to the housing, the flexible bottom element creates a bridge over the slot between the pendulum plate and the housing, which, in the state of the art, then forms when the pendulum plate is swiveled relative to the housing of the inclined conveyor. In this way, the transfer of the crop from the pendulum plate into the housing of the inclined conveyor is facilitated and improved with the pendulum plate swiveled around the pendulum axle. Therefore, on the discharge side, one attains a more homogeneous distribution of the crop over the width of the inclined conveyor than was the case up to now.

In a preferred embodiment of the invention, the flexible bottom element extends backward up to at least the middle of the inclined conveyor. In this way, relatively small slope angles are produced for the crop even with the pendulum plate swiveled around the pendulum axle. It would, however, also be conceivable to design the flexible bottom element shorter and to allow an extension only over a fraction (for example, a tenth) of the length of the inclined conveyor. In another embodiment, the flexible bottom element extends over the entire length of the inclined conveyor, that is, up to the upper. conveyor roller.

The flexible bottom element can be made of an inherently flexible material, such as rubber or spring steel. However, since the coefficient of friction, especially of rubber, is higher than that of the steel that is usually used for the bottom of inclined conveyors, there is the possibility in this case of placing one or more sliding elements for the reduction of the friction on the upper side of the flexible bottom elements; they have a smaller coefficient of friction than the flexible material. The sliding elements can extend transverse to the longitudinal direction of the inclined conveyor or in its longitudinal direction.

Furthermore, the flexible bottom element can be made of several elements, which follow one another in the transverse or longitudinal direction and overlap in the manner of scales or tiles.

In a preferred embodiment of the invention, the lower conveyor roller is supported on the pendulum plate such that it can rotate, and an endless, extendible conveyor element with carriers circulates around the lower conveyor roller and around the upper conveyor roller. In this way, the lower conveyor roller participates in the movement of the pendulum plate (and the harvesting attachment) around the pendulum axle, and the spatial relation between the harvesting attachment and its discharge opening and the lower conveyor roller remains constant even with a harvesting attachment that swivels around the pendulum axle. The movability required for this between the lower conveyor roller and the upper conveyor roller, for the circulation of the endless conveyor element around both, is made possible in that the conveyor element is extendible. In particular, it can be made of a rubber-fabric belt, on which the carriers are attached.

In accordance with another aspect of the invention, an inclined conveyor assembly for a combine harvester is provided, the inclined conveyor assembly comprising: a housing on whose rear end an upper conveyor roller is supported such that it can rotate, a lower conveyor roller positioned on the front end of the housing; an endless conveyor element circulating around the lower conveyor roller and around the upper conveyor roller, with carriers, and a pendulum plate hinged on the front end of the housing such that it can swivel around a pendulum axle, on which a harvesting attachment can be affixed, wherein a flexible bottom element is located below the endless conveyor element, and is coupled to the pendulum plate on its front end, and is coupled to the housing of the inclined conveyor assembly on its rear end.

The flexible bottom element may extend backward, at least to the middle of the inclined conveyor assembly.

The flexible bottom element may be made of an inherently flexible material.

On the upper side of the flexible bottom element, one or more sliding elements may be placed, which have a smaller coefficient of friction than the flexible material.

The sliding elements may extend transverse to the longitudinal direction of the inclined conveyor assembly or in its longitudinal direction.

The flexible bottom element may be made of a plurality of overlapping elements, which follow one another in the transverse or longitudinal direction.

The lower conveyor roller may be supported on the pendulum plate such that it can rotate, and the endless conveyor element may be extendible.

The endless conveyor element may comprise one or more rubber-fabric belts, on which the carriers are placed.

In accordance with another aspect of the invention, a combine harvester may comprise a chassis, front and rear wheels or caterpillar driving mechanisms, and an inclined conveyor assembly, placed on the front side of the combine harvester.

BRIEF DESCRIPTION OF THE DRAWINGS

These and other goals, features, and advantages of the invention under consideration are obvious to the specialist after reading the following detailed description and in view of the drawings.

DETAILED DESCRIPTION

Figure 1:
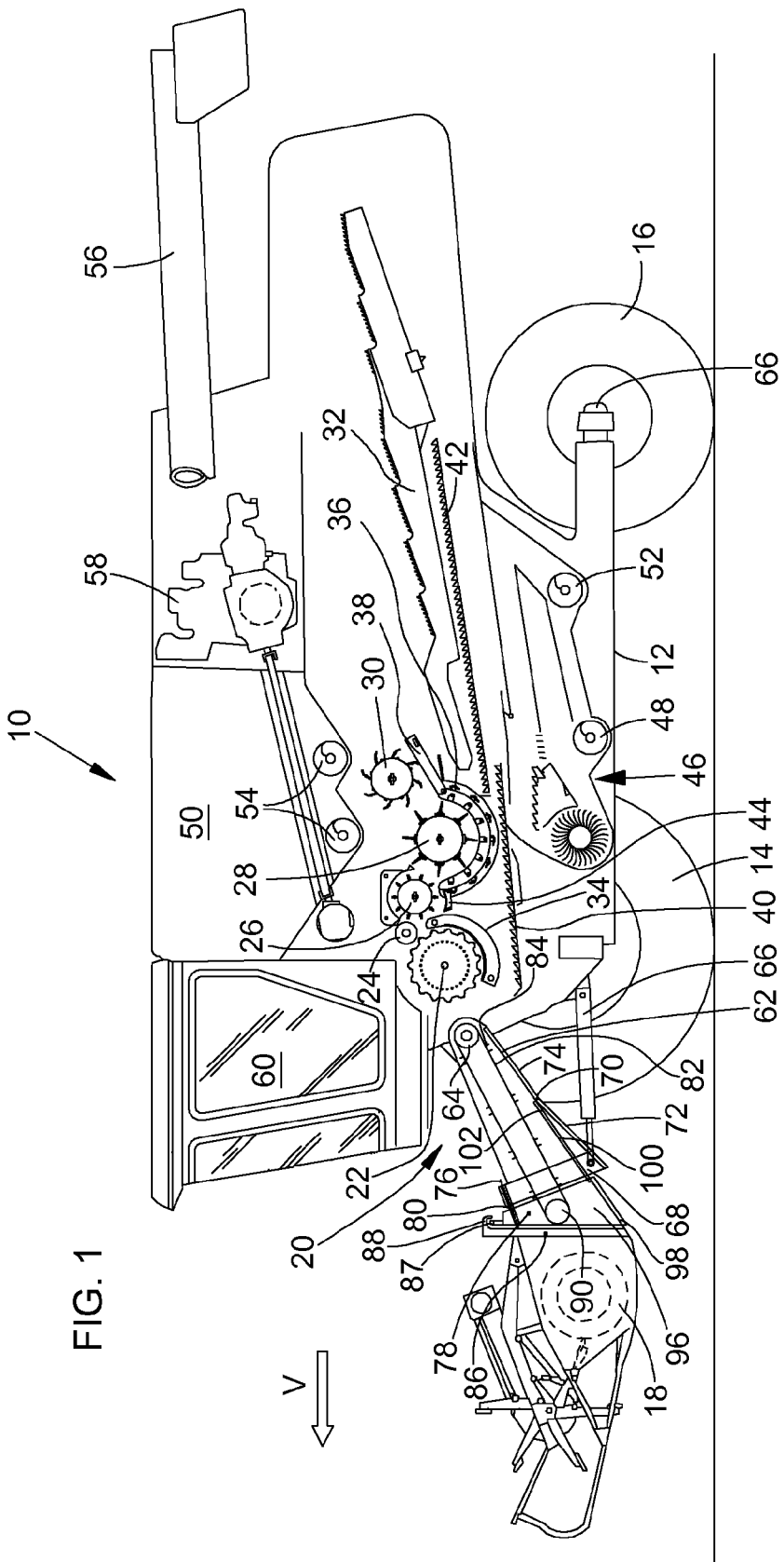
FIG. 1 is a lateral view of a combine harvester according to the invention with a harvesting attachment that is suspended on the front end of the inclined conveyor assembly for oscillating movement.

FIG. 1 shows a self-propelling harvesting machine in the form of a combine harvester 10 with a chassis 12, which is supported on the ground via driven front wheels 14 and steerable rear wheels 16 and is moved forward by them. The wheels 14 are rotated by means of driving means (not shown), so as to move the combine harvester 10, for example, over a field that is to be harvested. In the following, direction indications, such as front and back, refer to the travelling direction V of the combine harvester 10 during the harvesting operation, which runs toward the left in FIG. 1. The front wheels 14 could be replaced by caterpillar driving mechanisms. Preferably, the front wheels 14 (or the caterpillar driving mechanisms) can be adjusted in height, relative to the chassis 12, for the horizontal alignment of the chassis 12 when driving on a slope. The rear wheels 16 are affixed to an oscillating axle, so as to follow the contour of the ground.

A harvesting attachment 18, in the form of a cutting mechanism, is connected in a detachable manner on the front end area of the harvesting machine 10, so as to harvest, during a harvesting operation, crops in the form of grain or other threshable cereals from the field, and to conduct them upward and backward through an inclined conveyor assembly 20 to a multidrum threshing mechanism, which comprises, arranged one after the other in the travelling direction V, a threshing drum 22, a stripping drum 24, a conveyor drum 26, working from above, a tangential separator 28, and a turning drum 30. There is a straw walker 32 downstream from the turning drum 30. The threshing drum 22 is surrounded by a threshing basket 34 in its lower and rear area. Below the conveyor drum 26, there is a cover 44 which is closed or provided with openings, whereas above the conveyor drum 26, there is a permanent cover, and below the tangential separator 28, a separating basket 36 with adjustable finger elements. There is a finger rake 38 below the turning drum 30. Instead of the multidrum threshing mechanism, any other threshing and separating devices could be used, for example, a single tangential threshing drum with subsequent straw walkers or separating rotors, or an axial threshing and separating device with one or two axial threshing and separating rotors.

The mixture, which contains grains and impurities and passes through the threshing basket 34, the separating basket, and the straw walkers 32, arrives via conveyor bottoms 40, 42 at a cleaning device 46. Grain that is cleaned by the cleaning device 46 is supplied by means of a grain auger 48 to an elevator (not shown), which it conveys into a grain tank 50. A return auger 52 takes back unthreshed ear parts, through another elevator (not shown), to the threshing process. The chaff can be thrown out to the rear of the sieve device by a rotating chaff distributor, or it is discharged through a straw chopper (not shown), which is located downstream from the straw walker 32. The cleaned grain from the grain tank 50 can be unloaded by an unloading system with cross augers 54 and an unloading conveyor 56. The aforementioned systems are driven by means of a combustion engine 58 and controlled and guided by an operator from a driver's cabin 60.

The inclined conveyor assembly 20 comprises a housing 62, which can swivel around the axle of an upper conveyor roller 64, which extends horizontally and transverse to the forward direction, and is hinged on the chassis 12. The swiveling of the inclined conveyor assembly 20 around the axle of the upper conveyor roller 64 takes place by means of a plurality of actuators 66, in the form of hydraulic cylinders, which are hinged on a rectangular (when viewed from the front) frame element 68 on both sides of the inclined conveyor assembly 20, one end on the lower front end of the chassis 12 and the other end to the rear of the front, lower end of the housing 62 of the inclined conveyor assembly 20. A control (not shown) manages the actuators 66 during the harvesting operation in such a way that the harvesting attachment 18 is moved at a desired height with a desired applied force over the ground of the field to be harvested. The housing 62 of the inclined conveyor assembly 20 comprises, in a manner which is in fact known, lower and upper walls which are connected to one another by lateral walls. The lower wall of the housing 62 is bent, inclined downward, at a point which is approximately at the halfway point 70 of the length of the housing 62, so that it comprises an upper part 74 and a lower part 72, which is bent forward and downward relative to the upper part 74; on its lower end below an intended prolongation of the upper part 74 of the lower wall of the housing 62, it is connected with the rectangular frame element 68.

The rectangular frame element 68 is either rigidly connected with the housing 62 or, for the adaptation of the orientation of the harvesting attachment 18 to the individual harvesting conditions and/or to the dimensions of the wheels 14, 16 of the combine harvester 10 and the inclined conveyor assembly 20, in such a way that it can swivel around an axle (not shown) running transverse to the forward direction and horizontally. The rectangular frame element 68 carries a pendulum plate 78 that is horizontally oriented via a swivel pin 80 placed in the middle on the upper, horizontal part of the frame element 68. The pendulum plate 78 can swivel around a pendulum axle 76, which is defined by the swivel pin 80 and which, in a top view from above, parallel to the forward direction V, and regarded laterally, as shown in FIG. 1, extends at an incline backward and upward relative to the frame element 68 and the housing 62.

In the embodiment shown, the pendulum axle 76 is oriented parallel to an intended connection line between the middle of the pendulum plate 78 (that is, the rotation axis of the lower conveyor roller 90) and the rotation axis of the upper conveyor roller 64. This backward and upward inclination of the pendulum axle 76 is provided, in particular, if a frame element 68, which can be adjusted transverse to the forward direction and horizontally, is located in a position suitable for the normal harvesting operation. In another embodiment of the invention or with a frame element 68 adjusted around the aforementioned axle, the pendulum axle 76 can also be oriented further downward or upward and, in particular, in an area which is limited, on the one hand, by a line that intersects pendulum axle 76, parallel to the connecting line between the rotation axis of the lower conveyor roller 90 and the rotation axis of the upper conveyor roller 64, and, on the other hand, by an intended connecting line between the pendulum axle 76 and the (lower side of the) upper conveyor roller 64. This area could also be extended upward, symmetrical to the aforementioned line that intersects pendulum axle 76 parallel to the aforementioned connecting line. If the pendulum axle 76 is located below the pendulum plate 78, this area is reflected relative to the aforementioned area around the connecting line. This area could also be extended downward, symmetrical to the aforementioned parallel line.

An affixing frame 86 of the harvesting attachment 18 is supported by hooks 88 on the pendulum plate 78; they overlap projections 87 of the pendulum plate 78. The harvesting attachment 18 can accordingly be removed from the pendulum plate 78 by positioning the harvesting attachment over a suitable placement (for example, a cutting mechanism transport vehicle) and then the inclined conveyor assembly 20 is lowered by means of the actuators 66, wherein the hooks 88 are then detached from the pendulum plate 78. The placement is carried out in a reverse sequence and direction. It would also be possible to provide other latches between the harvesting attachment 18 and the pendulum plate 78 that can be actuated manually or with the use of external force. The swiveling of the harvesting attachment 18 and the pendulum plate 78 around the pendulum axle 76 can take place merely with the force of gravity, or externally effective actuators (not shown) are provided, which vary the swiveling angles around the pendulum axle 76 in a manner which is, in fact, known, automatically on the basis of signals from sensors which are distributed over the width of the harvesting attachment 18, for the registering of the height above the ground and/or the application pressure.

Figure 2:
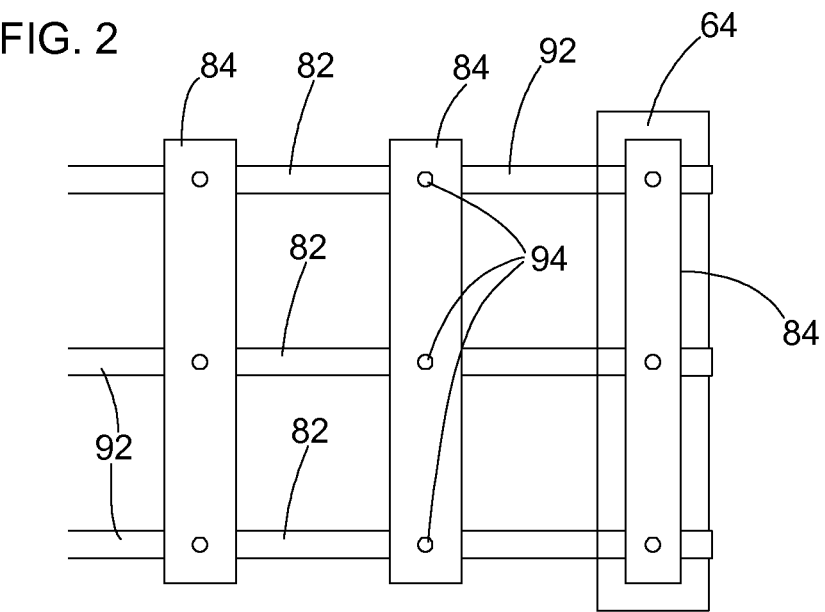
FIG. 2 shows a top view of the endless conveyor element and the carriers.

A lower conveyor roller 90 is supported such that it can rotate on the pendulum plate 78. Its rotation axis extends with the pendulum plate 78 transverse to the forward direction V and horizontally. An endless conveyor element 82 with carriers 84 circulates around the upper conveyor roller 64 and the lower conveyor roller 90; it conveys the crops from below during the operation. The endless conveyor element 82 is extendible and preferably comprises a plurality of rubber-fabric belts 92, which are distributed over the width of the housing 62 and are connected to one another by the carriers 84, as shown in FIG. 2. The arrangement from FIG. 2 can be doubled thereby—that is, two carriers 84 with the corresponding rubber-fabric belts 92 can be arranged laterally, next to one another, in the housing 62. The drive of the endless conveyor element 82 is carried about via sprockets which are placed on its interior and which mesh into corresponding recesses in the upper conveyor roller 64 and the lower conveyor roller 90, of which at least one can be driven by the combustion engine 58. The carriers 84 are constructed as U-shaped steel strips, which extend over the width of the housing 62, but could also be made of another material and have another cross section. To bring about an optimal connection between the carriers 84 and the endless conveyor element 82, screw bolts 94 are vulcanized into the rubber-fabric belts 92. The endless conveyor element 82 is placed under tension in such a way that the carriers 84 with the pendulum plate 78 do not scratch along the bottom of the housing 62, which minimizes wear and tear and the generation of noise.

In a side view, as shown in FIG. 1, the pendulum plate 78 is approximately trapezoidal or triangular, since the rectangular frame element 68 extends at an incline, forward and upward, at the front end of the housing 62 of the inclined conveyor assembly 20, as a result of the pendulum axle 76, which is oriented backward and upward, whereas the affixing frame 86 of the harvesting attachment extends in an approximately vertical manner in the normal operating position of the harvesting attachment 18 (corresponding to a normal cutting height), shown in FIG. 1, and the pendulum plate 78 fills up the intermediate space. The pendulum plate 78 has side walls 96 and a bottom 98, like the housing 62 of the inclined conveyor assembly 20. The pendulum plate 78 is preferably stiffened by frame elements (not shown). In order to reduce the torque on the swivel pin 80, other connecting elements (not shown) that permit a relative movement, for example, rollers, are placed between the bottom 98 or the lower, rear end of the pendulum plate 78 and the rectangular frame element 68 on the front end of the housing 62 of the inclined conveyor assembly 20.

A flexible bottom element 100 extends between the bottom 98 of the pendulum plate 78 and the halfway point 70 between the lower part 72 and the upper part 74 of the lower wall of the housing 62. The flexible bottom element 100 extends over the entire width of the housing 62. The flexible bottom element 100 is produced from a material which is, in fact, flexible, such as spring steel or rubber, in the embodiment shown in FIG. 1. The flexible bottom element 100 is affixed (over its width), at least on the bottom 98 and on the halfway point 70 of the housing 62.

The flexible bottom element 100 can also be coupled with the side walls of the housing 62 in such a manner that it can be displaced, for example, by angular elements (not shown); [it can] comprise a horizontal leg, coupled with the flexible bottom element 100, and a vertical leg with one or more longitudinal holes, through which a pin, connected to the side wall of the housing 62, extends. The pin could also be affixed on the vertical leg and extend through a longitudinal hole in the side wall of the housing 62. In this way, a sealing can be attained between the flexible bottom element 100 and the side wall of the housing 62, so as to prevent significant quantities of crops from arriving at the gap between the flexible bottom element 100 and the lower part 72 of the lower wall of the housing 62. In order to prevent crops from collecting in the gap between the flexible bottom element 100 and the lower part 72 of the lower wall of the housing 62 and, finally, preventing the movement of the flexible bottom element 100, the lower part 72 of the lower wall of the housing 62 can be provided with openings or be made as a grid construction.

Figure 3:
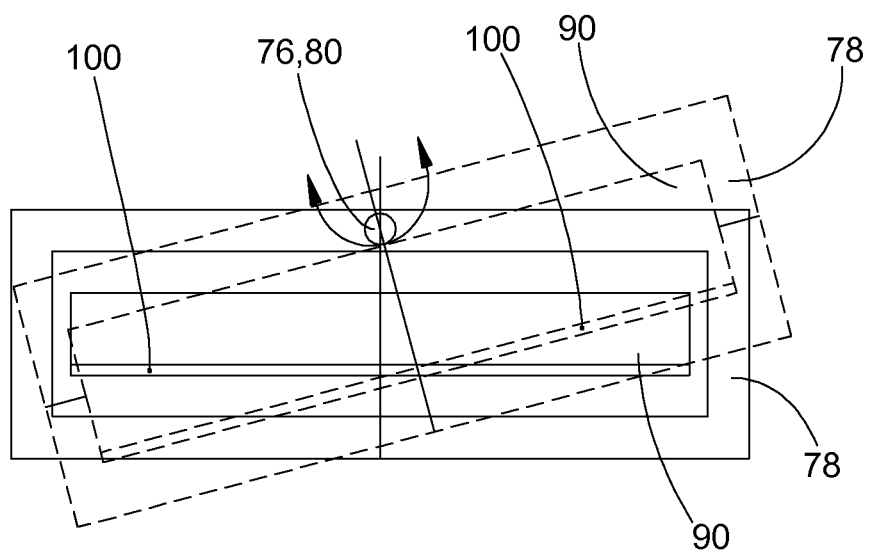
FIG. 3 is a schematic front view of the pendulum plate with the lower conveyor roller affixed thereon, and the front area of the inclined conveyor assembly.

As one can see with the aid of FIG. 3, the pendulum plate 78 and the lower conveyor roller 90 carry out the same swiveling movement around the pendulum axle 76. In this way, the transfer of crops from the harvesting attachment 18 to the inclined conveyor assembly 20 is also optimized with the pendulum plate 78 swiveled around the pendulum axle 76. The extensibility of the endless conveyor element 82 makes possible the swiveling of the lower conveyor roller 90 relative to the upper conveyor roller 64 around the pendulum axle 76. This movement around the pendulum axle 76 is also carried out by the front end of the flexible bottom element 100, as is shown in FIG. 3. The rear end of the flexible bottom element 100 is, on the other hand, coupled at halfway point 70 with the housing 62 of the inclined conveyor assembly 20 and does not carry out any pendulum movement around the pendulum axle 76. The flexible bottom element 100 is accordingly wound around the pendulum axle 76 in itself with the pendulum movement of the pendulum plate 78 and the harvesting attachment 18. This winding can be carried out due to its flexibility. Thus, one receives a bottom of the inclined conveyor assembly, formed by the flexible bottom element 100, between the pendulum plate 78 and the halfway point 70 which forms a ramp adapted to the pendulum angle and makes possible a relatively flat transfer of the crop from the pendulum plate 78 to the upper part 74 of the housing 62 of the inclined conveyor assembly 20.

Due to the upward and backward inclination of the pendulum axle 76, the change in distance between the upper conveyor roller 64 and the lower conveyor roller 90 as the pendulum plate 78 oscillates around the pendulum axle 76 remains sufficiently small, and can be absorbed by the elasticity of the endless conveyor element 82. Furthermore, in this way, the transfer of crops from the harvesting attachment 18 and the pendulum plate 78 into the inclined conveyor assembly 20 is improved.

Figure 4:
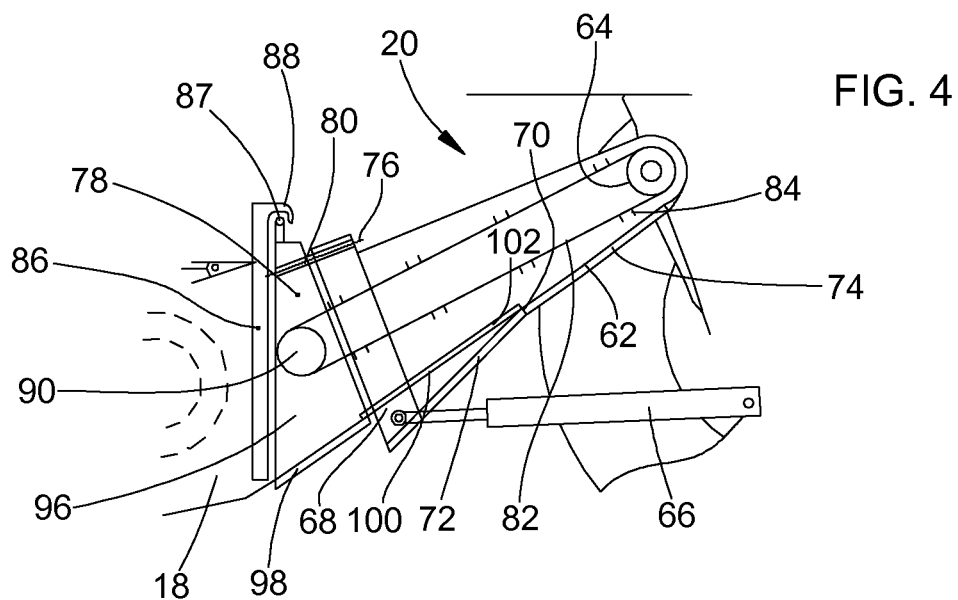
FIG. 4 shows an enlarged view of the inclined conveyor assembly of FIG. 1 with a second embodiment of a flexible bottom element.

In the embodiment shown in FIG. 4, sliding elements 102 are also placed above the flexible bottom element 100; they are made of a material (for example, plastic), that has a smaller coefficient of friction than the flexible material (in particular, rubber) of the flexible bottom element 100. The sliding elements 102 can be in the shape of strips and be oriented in the conveyance direction of the crops or arranged behind one another, transverse to them. They are separately connected to the flexible bottom element 100, for example, by screws or rivets.

Figure 5:
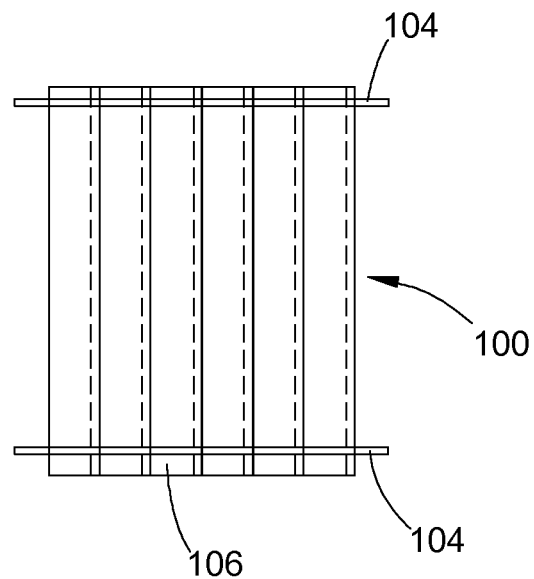
FIG. 5 shows a top view of a third embodiment of a flexible bottom element.

In the embodiment shown in FIG. 5, the flexible bottom element 100 is composed of a plurality of overlapping elements 106 arranged successively in the longitudinal direction (that is, the flow direction of the crops). These overlapping elements 106 are affixed, in fact, to carrying bars 104, extending in the forward direction. In this embodiment, the overlapping elements 106 can be made of inherently flexible material, such as spring steel or rubber, whereas the carrying bars can be inherently rigid or flexible. In the second case, the overlapping elements 106 can also be inherently rigid. The overlapping elements 106 are covered in the crop flow direction, wherein steps which dip toward the rear are formed in the crop flow direction that do not disturb the flow of crops any further. In a manner different from that shown in FIG. 5, the overlapping elements 106 could also extend in the crop flow direction—that is, could also be rotated by 90°.

It should also be noted that the endless conveyor element 82 can be initially manufactured as an endless loop or can be manufactured as a belt having two ends (e.g. a strip), which ends can be connected to each other by suitable means to make the endless loop. The upper conveyor roller 64 and the lower conveyor roller 90 can be provided with a constant cross section over the length, as shown in FIG. 2, or they can embrace a shaft with mounted disks, on which the endless conveyor element 82 is supported. Furthermore, the pendulum axle 76 need not be real but rather can also be virtual, in that the pendulum plate 78 is supported by roller bearings on the frame element 68, which makes it possible to locate the pendulum axle 76 (i.e. to locate the axis of rotation of the pendulum plate 78 with respect to the frame element 68) in the middle of the pendulum plate 78. Finally, there is also the possibility of arranging the pendulum axle 76 on the underside of the pendulum plate 78.

The invention claimed is:

1. An inclined conveyor assembly (20) for a combine harvester (10), comprising:
   a housing (62) having a rear end and a front end;
   an upper conveyor roller (64) supported on the rear end such that it can rotate;
   a lower conveyor roller (90) positioned at the front end;
   an endless conveyor element (82) circulating around the lower conveyor roller (90) and around the upper conveyor roller (64);
   carriers (84) fixed to the endless conveyor element (82); and
   a pendulum plate (78) hinged on the front end of the housing (62) such that it can swivel around a pendulum axle (76), on which a harvesting attachment (18) can be affixed;
   wherein below the endless conveyor element (82), a flexible bottom element (100) is located and is coupled to the pendulum plate (78) on its front end, and is coupled to the housing (62) of the inclined conveyor assembly (20) on its rear end.

2. An inclined conveyor assembly (20) according to claim 1, wherein the flexible bottom element (100) extends backward, at least to the middle of the inclined conveyor assembly (20).

3. An inclined conveyor assembly (20) according to claim 1, wherein the flexible bottom element (100) is made of an inherently flexible material.

4. An inclined conveyor assembly (20) according to claim 3, wherein on the upper side of the flexible bottom element (100), one or more sliding elements (102) are placed, which have a smaller coefficient of friction than the flexible material.

5. An inclined conveyor assembly (20) according to claim 4, wherein the sliding elements (102) extend transverse to the longitudinal direction of the inclined conveyor assembly (20) or in its longitudinal direction.

6. An inclined conveyor assembly (20) according to claim 1, wherein the flexible bottom element (100) is made of a plurality of overlapping elements (106), which follow one another in the transverse or longitudinal direction.

7. An inclined conveyor assembly (20) according to claim 1, wherein the lower conveyor roller (90) is supported on the pendulum plate (78) such that it can rotate, and the endless conveyor element (82) is extendible.

8. An inclined conveyor assembly (20) according to claim 7, characterized in that the endless conveyor element (82) comprises one or more rubber-fabric belts (92), on which the carriers (84) are placed.

9. A combine harvester (10) comprises:
   a chassis (12);
   front and rear wheels (14, 16) mounted on the chassis (12); and
   an inclined conveyor assembly (20), placed on the front side of the combine harvester (10), wherein the inclined conveyor assembly (20) is in accordance with claim 1.

* * * * *